United States Patent
Okuda et al.

(10) Patent No.: US 10,323,301 B2
(45) Date of Patent: Jun. 18, 2019

(54) HYDROGEN STORING ALLOY, ELECTRODE, AND NICKEL-HYDROGEN STORAGE BATTERY

(71) Applicant: GS Yuasa International Ltd., Kyoto-shi, Kyoto (JP)

(72) Inventors: Daisuke Okuda, Kyoto (JP); Manabu Kanemoto, Kyoto (JP); Mitsuhiro Kodama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 767 days.

(21) Appl. No.: 14/866,070

(22) Filed: Sep. 25, 2015

(65) Prior Publication Data
US 2016/0090643 A1  Mar. 31, 2016

(30) Foreign Application Priority Data

Sep. 30, 2014  (JP) .................................. 2014-200689
Sep. 30, 2014  (JP) .................................. 2014-200690

(51) Int. Cl.

| | | |
|---|---|---|
| *C22C 19/03* | (2006.01) | |
| *H01M 4/38* | (2006.01) | |
| *H01M 10/34* | (2006.01) | |
| *C22C 19/00* | (2006.01) | |
| *H01M 10/30* | (2006.01) | |
| *B22F 9/00* | (2006.01) | |
| *C22C 1/04* | (2006.01) | |

(52) U.S. Cl.
CPC .............. *C22C 19/03* (2013.01); *B22F 9/002* (2013.01); *C22C 1/0433* (2013.01); *C22C 19/007* (2013.01); *H01M 4/383* (2013.01); *H01M 10/30* (2013.01); *H01M 10/345* (2013.01); *B22F 2998/00* (2013.01); *B22F 2998/10* (2013.01); *Y02E 60/124* (2013.01)

(58) Field of Classification Search
CPC ..................................................... C22C 19/03
See application file for complete search history.

(56) References Cited

U.S. PATENT DOCUMENTS

2009/0169995 A1* 7/2009 Yoshida ................ H01M 4/242
429/218.2

FOREIGN PATENT DOCUMENTS

| JP | 11323469 | A2 | 11/1999 |
|---|---|---|---|
| JP | 2007291474 | A2 | 11/2007 |
| JP | 2008071687 | A2 | 3/2008 |
| JP | 2009176712 | A2 | 8/2009 |
| JP | 2011021262 | A2 | 2/2011 |
| JP | 2011082129 | A2 | 4/2011 |
| JP | 2012067357 | A2 | 4/2012 |
| JP | 201299250 | | 5/2012 |
| JP | 2014114476 | A2 | 6/2014 |
| WO | 2012057351 | | 5/2012 |

OTHER PUBLICATIONS

Machine translation of WO2012057351A1 (Japanese language document published May 3, 2012).*

* cited by examiner

*Primary Examiner* — Christopher S Kessler

(74) *Attorney, Agent, or Firm* — Rankin, Hill & Clark LLP

(57) ABSTRACT

Provided is a hydrogen storing alloy represented by the general formula:
$(RE_{1-a-b}Sm_aMg_b)(Ni_{1-c-d}Al_cM_d)_x$ (where $0.3<a<0.6$; $0<b<0.16$; $0.1<cx<0.2$; $0\le dx\le0.1$; $3.2<x<3.5$; RE is at least one element selected from the group consisting of a rare earth element other than Sm, and Y, and essentially contains La; and M is Mn and/or Co). Also provided is a hydrogen storing alloy represented by the general formula:
$(RE_{1-a-b}Sm_aMg_b)(Ni_{1-c-d}Al_cM_d)_x$ (where $0.1<a<0.25$; $0.1<b<0.2$; $0.02<cx<0.2$; $0\le dx\le0.1$; $3.6<x<3.7$; RE is at least one element selected from the group consisting of a rare earth element other than Sm, and Y, and essentially contains La; and M is Mn and/or Co). Further provided is a nickel-metal hydride rechargeable battery including a negative electrode containing the hydrogen storing alloy.

12 Claims, No Drawings

HYDROGEN STORING ALLOY, ELECTRODE, AND NICKEL-HYDROGEN STORAGE BATTERY

CROSS-REFERENCE TO RELATED APPLICATIONS

This application claims the benefit of Japanese patent applications No. 2014-200689, filed on Sep. 30, 2014, and No. 2014-200690, filed on Sep. 30, 2014, which are incorporated by reference.

FIELD

The present invention relates to a novel hydrogen storing alloy, an electrode containing the hydrogen storing alloy, and a nickel-metal hydride rechargeable battery including the electrode.

BACKGROUND

Nickel-metal hydride rechargeable batteries are widely used as power sources for small electronic devices such as digital cameras and notebook personal computers due to their high energy density, and as power sources for electric automobiles and hybrid automobiles due to their suitability for high-power applications and excellent safety.

Such a nickel-metal hydride rechargeable battery normally includes a nickel electrode containing a positive active material mainly composed of nickel hydroxide, a negative electrode containing a hydrogen storing alloy as a main material, a separator, and an alkali electrolyte solution. Among these battery constituent materials, particularly the hydrogen storing alloy as a main material of the negative electrode significantly affects performance of the nickel-metal hydride rechargeable battery, such as a discharge capacity and an energy density. As the hydrogen storing alloy, various kinds of alloys have been heretofore examined.

Particularly, for the purpose of increasing the capacity of a nickel-metal hydride rechargeable battery, an attempt has been made to use a rare earth-Mg—Ni-based hydrogen storing alloy for a negative electrode (see Japanese Patent Laid-open Publication No. 11-323469).

However, the rare earth-Mg—Ni-based alloy has the problem that it is extremely poor in durability when used as a negative electrode of a battery. This is ascribable to occurrence of distortion among a plurality of crystal phases included in the alloy due to absorption and release of hydrogen associated with charge-discharge. There is also the problem that repetition of charge-discharge accelerates pulverization of the hydrogen storing alloy, leading to deterioration of durability. Further, the hydrogen storing alloy has the problem that it is easily corroded when the battery is stored under a high-temperature atmosphere, or charge-discharge is repeated.

In order to solve these problems, studies have been repeatedly conducted heretofore for optimizing the ratio of substitution elements or crystal phases (see, for example, Japanese Patent Laid-open Publication No. 2007-291474, Japanese Patent Laid-open Publication No. 2008-71684, Japanese Patent Laid-open Publication No. 2009-176712, Japanese Patent Laid-open Publication No. 2011-21262, Japanese Patent Laid-open Publication No. 2011-82129, Japanese Patent Laid-open Publication No. 2012-67357 and Japanese Patent Laid-open Publication No. 2014-114476), but an alloy having satisfactory corrosion resistance and durability has not been obtained yet.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide a hydrogen storing alloy excellent in corrosion resistance and durability, and a nickel-metal hydride rechargeable battery which includes the hydrogen storing alloy and is excellent in cycle life.

The aspect of the present invention employs the following means for achieving the object.

(1) A hydrogen storing alloy represented by the general formula:

$(RE_{1-a-b}Sm_aMg_b)(Ni_{1-c-d}Al_cM_d)_x$ (where $0.3<a<0.6$; $0<b<0.16$; $0.1<cx<0.2$; $0≤dx≤0.1$; $3.2<x<3.5$; RE is at least one element selected from the group consisting of a rare earth element other than Sm, and Y, and essentially contains La; and M is Mn and/or Co).

DESCRIPTION OF EMBODIMENTS

The aspect of the present invention employs the following means for achieving the object.

(1) A hydrogen storing alloy represented by the general formula:

$(RE_{1-a-b}Sm_aMg_b)(Ni_{1-c-d}Al_cM_d)_x$ (where $0.3<a<0.6$; $0<b<0.16$; $0.1<cx<0.2$; $0≤dx≤0.1$; $3.2<x<3.5$; RE is at least one element selected from the group consisting of a rare earth element other than Sm, and Y, and essentially contains La; and M is Mn and/or Co).

(2) The hydrogen storing alloy according to (1), wherein the content of La in RE is 0.3 or more in terms of a molar amount based on the total amount of RE, Sm and Mg.

(3) A hydrogen storing alloy represented by the general formula:

$(RE_{1-a-b}Sm_aMg_b)(Ni_{1-c-d}Al_cM_d)_x$ (where $0.1<a<0.25$; $0.1<b<0.2$; $0.02<cx<0.2$; $0≤dx≤0.1$; $3.6<x<3.7$; RE is at least one element selected from the group consisting of a rare earth element other than Sm, and Y, and essentially contains La; and M is Mn and/or Co).

(4) The hydrogen storing alloy according to (3), wherein the content of La in RE is 0.6 or more in terms of a molar amount based on the total amount of RE, Sm and Mg.

(5) The hydrogen storing alloy according to (1), wherein RE contains Nd and/or Pr.

(6) The hydrogen storing alloy according to (2), wherein RE contains Nd and/or Pr.

(7) The hydrogen storing alloy according to (3), wherein RE contains Nd and/or Pr.

(8) The hydrogen storing alloy according to (4), wherein RE contains Nd and/or Pr.

(9) The hydrogen storing alloy according to (1), wherein the hydrogen storing alloy contains 70% by mass or more of a $Ce_2Ni_7$ phase as a crystal phase of the alloy.

(10) The hydrogen storing alloy according to (2), wherein the hydrogen storing alloy contains 70% by mass or more of a $Ce_2Ni_7$ phase as a crystal phase of the alloy.

(11) The hydrogen storing alloy according to (5), wherein the hydrogen storing alloy contains 70% by mass or more of a $Ce_2Ni_7$ phase as a crystal phase of the alloy.
(12) The hydrogen storing alloy according to (6), wherein the hydrogen storing alloy contains 70% by mass or more of a $Ce_2Ni_7$ phase as a crystal phase of the alloy.
(13) The hydrogen storing alloy according to (3), wherein the hydrogen storing alloy contains 80% by mass or more of a $Pr_5Co_{19}$ phase and $Ce_5Co_{19}$ phase as a crystal phase of the alloy.
(14) The hydrogen storing alloy according to (4), wherein the hydrogen storing alloy contains 80% by mass or more of a $Pr_5Co_{19}$ phase and $Ce_5Co_{19}$ phase as a crystal phase of the alloy.
(15) The hydrogen storing alloy according to (7), wherein the hydrogen storing alloy contains 80% by mass or more of a $Pr_5Co_{19}$ phase and $Ce_5Co_{19}$ phase as a crystal phase of the alloy.
(16) The hydrogen storing alloy according to (8), wherein the hydrogen storing alloy contains 80% by mass or more of a $Pr_5Co_{19}$ phase and $Ce_5Co_{19}$ phase as a crystal phase of the alloy.
(17) An electrode including the hydrogen storing alloy according to (1).
(18) An electrode including the hydrogen storing alloy according to (3).
(19) A nickel-metal hydride rechargeable battery including the electrode according to (17) as a negative electrode.
(20) A nickel-metal hydride rechargeable battery including the electrode according to (18) as a negative electrode.

(First Embodiment)

The first embodiment of the present invention will be described in detail below.

The hydrogen storing alloy according to the first embodiment of the present invention is a hydrogen storing alloy represented by the general formula: $(RE_{1-a-b}Sm_aMg_b)(Ni_{1-c-d}Al_cM_d)_x$ (where $0.3<a<0.6$; $0<b<0.16$; $0.1<cx<0.2$; $0 \le dx \le 0.1$; $3.2<x<3.5$; RE is at least one element selected from the group consisting of a rare earth element other than Sm, and Y, and essentially contains La; and M is Mn and/or Co).

In the hydrogen storing alloy according to the first embodiment of the present invention, B/A (numerical value range of x) is more than 3.2 and less than 3.5 as shown in the above-mentioned general formula. When a hydrogen storing alloy in which B/A falls within the above-mentioned range, the content of a $Ce_2Ni_7$ phase is 70% by mass or more, so that corrosion resistance is improved. In either the case where B/A is 3.2 or less or the case where B/A is 3.5 or more, corrosion resistance is deteriorated.

It has become apparent that when an alloy having a specific B/A ratio as described above is substituted with a predetermined amount of Sm (samarium), a hydrogen storing alloy having high corrosion resistance (durability) can be obtained. For improving corrosion resistance, the Sm substitution amount is more than 0.3 and less than 0.6 in terms of a molar amount based on the total amount of Sm, RE (at least one element selected from the group consisting of a rare earth element other than Sm, and Y) and Mg. The Sm substitution amount is preferably 0.5 or less. In either the case where the Sm substitution amount is 0.3 or less or the case where the Sm substitution amount is 0.6 or more, corrosion resistance is deteriorated.

For the mechanism in which corrosion resistance is improved when the Sm substitution amount is more than 0.3 and less than 0.6, it is thought that when the alloy is substituted with a predetermined amount of Sm, the $Ce_2Ni_7$ phase is stably generated, so that the crystal structure is uniquely stabilized, and thus distortion of the overall alloy can be prevented.

In the hydrogen storing alloy according to the first embodiment of the present invention, RE is at least one element selected from the group consisting of a rare earth element other than Sm, and Y, and essentially contains La as a main component. The content of La is preferably 0.3 or more, more preferably 0.3 to 0.5 in terms of a molar amount based on the total amount of Sm, RE (at least one element selected from the group consisting of a rare earth element other than Sm, and Y) and Mg. In the case where La is not contained, corrosion resistance is not improved even when the above-mentioned general formula is satisfied. Examples of RE excluding La include Nd, Pr, Ce, Dy and Gd, and among them, Nd and/or Pr are preferred because corrosion resistance is improved when these elements are contained.

In the hydrogen storing alloy according to the first embodiment of the present invention, the content of Mg is less than 0.16 in terms of a molar amount based on the total amount of Sm, RE (at least one element selected from the group consisting of a rare earth element other than Sm, and Y) and Mg for improving corrosion resistance. The content of Mg is preferably less than 0.15. When the content of Mg is 0.16 or more, corrosion resistance is deteriorated.

In the hydrogen storing alloy according to the first embodiment of the present invention, the main component that forms the B site is Ni, and when along with Ni, Al is contained in an amount of more than 0.1 and less than 0.2 in terms of molar amount multiplied by X, a hydrogen storing alloy having improved corrosion resistance is obtained. In either the case where the Al amount is 0.1 or less or the case where the Al amount is 0.2 or more, corrosion resistance is deteriorated. Along with Al, Mn and/or Co can be contained in an amount of 0.1 or less in terms of a molar amount multiplied by X for improving corrosion resistance.

In the hydrogen storing alloy according to the first embodiment of the present invention, corrosion resistance is improved when the crystal phase contains 70% by mass or more of a $Ce_2Ni_7$ phase. In addition to the $Ce_2Ni_7$ phase, a $Gd_2Co_7$ phase, a $Pr_5Co_{19}$ phase, a $Ce_5Co_{19}$ phase, a $CaCu_5$ phase or the like may be contained.

A method for producing the hydrogen storing alloy of this embodiment includes, for example, a melting step of melting an alloy raw material blended so as to achieve a predetermined composition ratio as described above; a cooling step of solidifying the molten alloy raw material; an annealing step of annealing the cooled alloy; and a grinding step of grinding the alloy.

The steps will be described more in detail. First, a predetermined amount of a raw material ingot (alloy raw material) is weighed based on the chemical composition of an intended hydrogen storing alloy.

In the melting step, the alloy raw material is added in crucible, and melted at 1000° C. or higher in an inert gas atmosphere or in vacuum using a high-frequency melting furnace etc. The upper limit of the melting temperature is about 2000° C. For example, the alloy raw material is heated at 1200 to 1600° C. to be melted.

In the cooling step, the molten alloy raw material is cooled to be solidified. The cooling speed may be either a slow cooling speed or 1000 K/second or more (also referred to as a rapid cooling speed), but it is preferred to use a rapid cooling speed. Rapid cooling at 1000 K/second has an effect of causing the alloy composition to become fine and heterogeneous. The cooling speed can be set to 1000000 K/second or less.

Specifically, a water-cooling mold method, a melt spinning method with a cooling speed of 100000 K/second or more, a gas atomizing method with a cooling speed of about 10000 K/second, or the like can be used as the cooling method.

In the annealing step, the alloy is heated at 860° C. or higher and 1000° C. or lower in a compressed state under an inert gas atmosphere using, for example, an electric furnace etc. Preferably, the alloy is heated at 930 to 975° C. The compression condition is preferably 0.2 MPa (gauge pressure) or more and 1.0 MPa (gauge pressure) or less. The treatment time is the annealing step is preferably 3 hours or more and 50 hours or less.

The grinding step may be carried out either before or after annealing, but since the surface area is increased by grinding, it is desirable to carry out the grinding step after the annealing step for preventing oxidation of the surface of the alloy. Preferably, grinding is performed in an inert atmosphere for preventing oxidation of the surface of the alloy.

As grinding means, for example, mechanical grinding, hydrogenation grinding or the like is used, and it is preferred to perform grinding in such a manner that the particle size of hydrogen storing alloy particles after grinding is approximately 20 to 70 μm.

The application of the hydrogen storing alloy according to the first embodiment of the present invention is not particularly limited, and it can be used in various applications such as nickel-metal hydride rechargeable batteries, fuel batteries, and fuel tanks for hydrogen automobiles. Particularly, the hydrogen storing alloy is suitably used for a negative active material of a nickel-metal hydride rechargeable battery. A nickel-metal hydride rechargeable battery including a negative electrode containing the hydrogen storing alloy according to the first embodiment of the present invention as described above is also one aspect of the present invention.

The nickel-metal hydride rechargeable battery according to the first embodiment of the present invention further includes a positive electrode (nickel electrode) containing a positive active material mainly composed of nickel hydroxide, a separator, an alkali electrolyte solution and so on in addition to the negative electrode containing as a negative active material the hydrogen storing alloy according to the first embodiment of the present invention.

The negative electrode contains as a negative active material the hydrogen storing alloy according to the first embodiment of the present invention. For example, the hydrogen storing alloy according to the first embodiment of the present invention is blended in the negative electrode in the form of a powdered hydrogen storing alloy.

The negative electrode may contain a conducting agent, a binder (including a thickener) and so on in addition to the hydrogen storing alloy powder.

Examples of the conducting agent include carbon-based conducting agents such as natural graphite (scaly graphite, scalelike, earthy graphite and the like), artificial graphite, carbon black, acetylene black, ketjen black, carbon whiskers, carbon fibers and vapor phase growth carbon; and metal-based conducting agents composed of powders, fibers and the like of metals such as nickel, cobalt and copper. These conducting agents may be used alone, or may be used in combination of two or more thereof. A rare earth oxide such as yttrium oxide may be contained as an anticorrosive agent.

The blending amount of the conducting agent is preferably 0.1 to 10 parts by mass, more preferably 0.2 to 5 parts by mass based on 100 parts by mass of the hydrogen storing alloy powder. When the blending amount of the conducting agent is less than 0.1 part by mass, it is difficult to achieve sufficient conductivity. On the other hand, when the blending amount of the conducting agent is more than 10 parts by mass, the discharge capacity improving effect may be insufficient.

Examples of the binder include polyolefin-based resins such as polytetrafluoroethylene (PTHE), polyethylene and polypropylene, ethylene-propylene-diene rubber (EPDM), sulfonated EPDM, styrene butadiene rubber, fluororubber, polyvinyl alcohol, methyl cellulose, carboxymethyl cellulose and xanthan gum. These binders may be used alone, or may be used in combination of two or more thereof.

The blending amount of the binder is preferably 0.1 to 1.0 parts by mass, more preferably 0.5 to 1.0 parts by mass based on 100 parts by mass of the hydrogen storing alloy powder. When the blending amount of the binder is less than 0.1 part by mass, it is difficult to achieve sufficient thickenability. On the other hand, when the blending amount of the binder is more than 1.0 part by mass, the performance of the electrode may be deteriorated.

The positive electrode is, for example, an electrode containing as a positive active material a nickel hydroxide composite oxide formed by mixing zinc hydroxide or cobalt hydroxide with nickel hydroxide as a main component. As the nickel hydroxide composite oxide, one that is uniformly dispersed by a coprecipitation method is suitably used.

Preferably, the positive electrode contains an additive for improving electrode performance in addition to the nickel hydroxide composite oxide. The additive is, for example, a conductivity modifier such as cobalt hydroxide or cobalt oxide. Alternatively, the nickel hydroxide composite oxide may be coated with cobalt hydroxide, or the nickel hydroxide composite oxide may be partially oxidized by oxygen, an oxygen-containing gas, $K_2S_2O_8$, hypochlorous acid or the like.

As the additive, a compound containing a rare earth element such as Y or Yb, or an oxygen overvoltage improving substance such as a compound containing Ca can also be used. The rare earth element such as Y or Yb is partially dissolved and disposed on the surface of the negative electrode, and is therefore expected to exhibit an effect of suppressing corrosion of a negative active material.

The positive electrode may further contain the conducting agent, binder and so on as in the case of the negative electrode.

The above-mentioned positive electrode and negative electrode can be produced by, for example, adding the conducting agent, binder and so on to each active material as necessary, then mixing the mixture together with water or an organic solvent such as an alcohol or toluene to obtain a paste, applying the paste to a conductive support, drying the paste, and performing roll molding.

Examples of the conductive support include steel plates, and plated steel plates obtained by subjecting a steel plate to plating with a metal material such nickel. Examples of the form of the conductive support include foams, molded products of fiber groups, three-dimensional substrates subjected to irregularity processing, and two-dimensional substrates such as punching plates. Among these conductive supports, a foam made from nickel excellent in corrosion resistance to alkalis and resistance to oxidation and composed of a porous structure that is a structure excellent in current collection property is preferred as a conductive support for a positive electrode. On the other hand, as a conductive support for a negative electrode, a pierced steel plate obtained by subjecting to nickel plating an iron foil which is inexpensive and excellent in conductivity.

The thickness of the conductive support is preferably 30 to 100 μm, more preferably 40 to 70 μm. When the thickness of the conductive support is less than 30 μm, productivity may be deteriorated. On the other hand, when the thickness of the conductive support is more than 100 μm, the discharge capacity may be insufficient.

When the conductive support is porous, the inner diameter thereof is preferably 0.8 to 2 μm, more preferably 1 to 1.5 μm. When the inner diameter is less than 0.8 μm, productivity may be deteriorated. On the other hand, when the inner diameter is more than 2 μm, the retention capacity of the hydrogen storing alloy may be insufficient.

Examples of the method for applying a paste for each electrode to the conductive support include roller coating using an applicator roll etc., screw coating, blade coating, spin coating and bar coating.

Examples of the separator include a porous films and nonwoven fabrics made from a polyolefin-based resin such as polyethylene or polypropylene, an acryl, a polyamide or the like.

The weight per unit area of the separator is preferably 40 to 100 g/m$^2$. When the weight per unit area is less than 40 g/m$^2$, a short circuit or deterioration of self discharge performance may occur. On the other hand, when the weight per unit area is more than 100 g/m$^2$, the battery capacity tends to decrease because the ratio of the separator per unit volume increases. The air permeability of the separator is preferably 1 to 50 cm/sec. When the air permeability is less than 1 cm/sec, the battery internal pressure may be excessively high. On the other hand, when the air permeability is more than 50 cm/sec, a short circuit or deterioration of self discharge performance may occur. Further, the average fiber diameter of the separator is preferably 1 to 20 μm. When average fiber diameter is less than 1 μm, the strength of the separator may be reduced, leading to an increase in defect rate in a battery assembling step. On the other hand, when the average fiber diameter is more than 20 μm, a short circuit or deterioration of self discharge performance may occur.

Preferably, the separator is subjected to a hydrophilization treatment at the fiber surface thereof. Examples of the hydrophilization treatment include a sulfonation treatment, a corona treatment, a fluorine gas treatment and a plasma treatment. Particularly, a separator subjected to a sulfonation treatment at the fiber surface is preferred because it has a high capability of adsorbing impurities such as $NO_3^-$, $NO_2^-$ and $NH_3^-$ and eluted elements from a negative electrode, which cause a shuttle phenomenon, and therefore exhibits a high self discharge suppressing effect.

Examples of the alkali electrolyte solution include alkaline aqueous solutions containing potassium hydroxide, sodium hydroxide, lithium hydroxide or the like. The alkali electrolyte solutions may be used alone, or may be used in combination of two or more thereof.

The concentration of the alkali electrolyte solution is preferably 9.0 M or less, more preferably 5.0 to 8.0 M in terms of the sum of ion concentrations.

To the alkali electrolyte solution may be added various additives for improvement of the oxygen overvoltage at the positive electrode, improvement of corrosion resistance of the negative electrode and improvement of self discharge. Examples of such additives include oxides and hydroxides such as those of Y, Yb, Er, Ca and Zn. These additives may be used alone, or may be used in combination of two or more thereof.

In the case where the nickel-metal hydride rechargeable battery according to the first embodiment of the present invention is an open-type nickel-metal hydride rechargeable battery, the battery can be produced by, for example, sandwiching a negative electrode in a positive electrode with a separator interposed therebetween, injecting an alkali electrolyte solution with the electrodes fixed in such a manner as to apply a predetermined pressure to the electrodes, and assembling an open-type cell.

On the other hand, in the case where the nickel-metal hydride rechargeable battery according to the first embodiment of the present invention is a closed-type nickel-metal hydride rechargeable battery, the battery can be produced by injecting an alkali electrolyte solution before or after laminating a positive electrode, a separator and a negative electrode, and sealing the electrolyte solution with an exterior material. In a closed-type nickel-metal hydride rechargeable battery formed by winding a power generating element in which a positive electrode and a negative electrode are laminated with a separator interposed therebetween, it is preferred to inject an alkali electrolyte solution in the power generating element before or after winding the power generating element. The method for injecting an alkali electrolyte solution is not particularly limited, and the alkali electrolyte solution may be injected at normal pressure, or for example, a vacuum impregnation method, a pressure impregnation method, a centrifugal impregnation method or the like may be used. Examples of the exterior material of the closed-type nickel-metal hydride rechargeable battery include those made of iron, iron subjected to plating with a metal material such as nickel, stainless steel, a polyolefin-based resin and so on.

The form of the closed-type nickel-metal hydride rechargeable battery is not particularly limited, and examples thereof include batteries including a positive electrode, a negative electrode and a monolayer or multilayer separator, such as coin batteries, button batteries, prismatic batteries and flat batteries, and cylindrical batteries including a roll-shaped positive electrode, negative electrode and separator.

(Second Embodiment)

The hydrogen-storing alloy according to the second embodiment of the present invention is one represented by the general formula: $(RE_{1-a-b}Sm_aMg_b)(Ni_{1-c-d}M_c)_x$ (where $0.1<a<0.25$; $0.1<b<0.2$; $0.02<cx<0.2$; $0≤dx≤0.1$; $3.6<x<3.7$; RE is at least one element selected from the group consisting of a rare earth element other than Sm, and Y, and essentially contains La; and M is Mn and/or Co).

In the hydrogen storing alloy according to the second embodiment of the present invention, B/A (numerical value range of x) is 3.6 or more and 3.7 or less as shown in the above-mentioned general formula. When a hydrogen storing alloy in which B/A falls within the above-mentioned range, the content of a $Pr_5Co_{19}$ phase and $Ce_5Co_{19}$ phase is 80% by mass or more, so that corrosion resistance is improved. In either the case where B/A is 3.6 or less or the case where B/A is 3.7 or more, corrosion resistance is deteriorated.

It has become apparent that when an alloy having a specific B/A ratio as described above is substituted with a predetermined amount of Sm (samarium), a hydrogen storing alloy having high corrosion resistance (durability) can be obtained. For improving corrosion resistance, the Sm substitution amount is 0.1 or more and 0.25 or less in terms of a molar amount based on the total amount of Sm, RE (at least one element selected from the group consisting of a rare earth element other than Sm, and Y) and Mg. In either the case where the Sm substitution amount is less than 0.1 or the case where the Sm substitution amount is more than 0.25, corrosion resistance is deteriorated.

For the mechanism in which corrosion resistance is improved when the Sm substitution amount is 0.1 or more and 0.25 or less, it is thought that when the alloy is substituted with a predetermined amount of Sm, the $A_5B_{19}$ phase ($Pr_5Co_{19}$ phase and $Ce_5Co_{19}$ phase) is stably generated, so that the crystal structure is uniquely stabilized, and thus distortion of the overall alloy can be prevented.

In the hydrogen storing alloy according to the second embodiment of the present invention, RE is at least one element selected from the group consisting of a rare earth element other than Sm, and Y, and essentially contains La as a main component. The content of La is preferably 0.6 or more, more preferably 0.7 or more in terms of a molar amount based on the total amount of Sm, RE (at least one element selected from the group consisting of a rare earth element other than Sm, and Y) and Mg. Examples of RE excluding La include Nd, Pr, Ce, Dy and Gd, and among them, Nd and/or Pr are preferred because corrosion resistance is improved when these elements are contained.

In the hydrogen storing alloy according to the second embodiment of the present invention, the content of Mg is more than 0.1 and less than 0.2 in terms of a molar amount based on the total amount of Sm, RE (at least one element selected from the group consisting of a rare earth element other than Sm, and Y) and Mg for improving corrosion resistance. The content of Mg is preferably less than 0.17. In either the case where the Al amount is 0.1 or less or the case where the Al amount is 0.2 or more, corrosion resistance is deteriorated.

In the hydrogen storing alloy according to the second embodiment of the present invention, the main component that forms B is Ni, and when along with Ni, Al is contained in an amount of more than 0.02 and less than 0.2 in terms of molar amount multiplied by X, a hydrogen storing alloy having improved corrosion resistance is obtained. The content of Al is preferably more than 0.05. In either the case where the Al amount is 0.02 or less or the case where the Al amount is 0.2 or more, corrosion resistance is deteriorated. Along with Al, Mn and/or Co can be contained in an amount of 0.1 or less in terms of a molar amount multiplied by X for improving corrosion resistance.

In the hydrogen storing alloy according to the second embodiment of the present invention, corrosion resistance is improved when the crystal phase contains 80% by mass or more of a $Or_5Co_{19}$ phase and a $Ce_5Co_{19}$ phase in total. The content of both the phases is more preferably 90% or more. The content of the $Ce_5Co_{19}$ is preferably 80% by mass or more. In addition to the $Pr_5Co_{19}$ phase and $Ce_5Co_{19}$ phase, a $Ce_2Ni_7$ phase, a $Gd_2Co_7$ phase, a $CaCu_5$ phase or the like may be contained.

A method for producing the hydrogen storing alloy of this embodiment includes, for example, a melting step of melting an alloy raw material blended so as to achieve a predetermined composition ratio as described above; a cooling step of solidifying the molten alloy raw material; an annealing step of annealing the cooled alloy; and a grinding step of grinding the alloy.

The steps will be described more in detail. First, a predetermined amount of a raw material ingot (alloy raw material) is weighed based on the chemical composition of an intended hydrogen storing alloy.

In the melting step, the alloy raw material is added in crucible, and melted at 1000° C. or higher in an inert gas atmosphere or in vacuum using a high-frequency melting furnace etc. The upper limit of the melting temperature is about 2000° C. For example, the alloy raw material is heated at 1200 to 1600° C. to be melted.

In the cooling step, the molten alloy raw material is cooled to be solidified. The cooling speed may be either a slow cooling speed or 1000 K/second or more (also referred to as a rapid cooling speed), but it is preferred to use a rapid cooling speed. Rapid cooling at 1000 K/second has an effect of causing the alloy composition to become fine and heterogeneous. The cooling speed can be set to 1000000 K/second or less.

Specifically, a water-cooling mold method, a melt spinning method with a cooling speed of 100000 K/second or more, a gas atomizing method with a cooling speed of about 10000 K/second, or the like can be used as the cooling method.

In the annealing step, the alloy is heated at 860° C. or higher and 1000° C. or lower in a compressed state under an inert gas atmosphere using, for example, an electric furnace etc. Preferably, the alloy is heated at 930 to 975° C. The compression condition is preferably 0.2 MPa (gauge pressure) or more and 1.0 MPa (gauge pressure) or less. The treatment time is the annealing step is preferably 3 hours or more and 50 hours or less.

The grinding step may be carried out either before or after annealing, but since the surface area is increased by grinding, it is desirable to carry out the grinding step after the annealing step for preventing oxidation of the surface of the alloy. Preferably, grinding is performed in an inert atmosphere for preventing oxidation of the surface of the alloy.

As grinding means, for example, mechanical grinding, hydrogenation grinding or the like is used, and it is preferred to perform grinding in such a manner that the particle size of hydrogen storing alloy particles after grinding is approximately 20 to 70 μm.

The application of the hydrogen storing alloy according to the second embodiment of the present invention is not particularly limited, and it can be used in various applications such as nickel-metal hydride rechargeable batteries, fuel batteries, and fuel tanks for hydrogen automobiles. Particularly, the hydrogen storing alloy is suitably used for a negative active material of a nickel-metal hydride rechargeable battery. A nickel-metal hydride rechargeable battery including a negative electrode containing the hydrogen storing alloy according to the second embodiment of the present invention as described above is also one aspect of the present invention.

The nickel-metal hydride rechargeable battery according to the second embodiment of the present invention further includes a positive electrode (nickel electrode) containing a positive active material mainly composed of nickel hydroxide, a separator, an alkali electrolyte solution and so on in addition to the negative electrode containing as a negative active material the hydrogen storing alloy according to the second embodiment of the present invention.

The negative electrode contains as a negative active material the hydrogen storing alloy according to the second embodiment of the present invention. For example, the hydrogen storing alloy according to the second embodiment of the present invention is blended in the negative electrode in the form of a powdered hydrogen storing alloy.

The negative electrode may contain a conducting agent, a binder (including a thickener) and so on in addition to the hydrogen storing alloy powder.

Examples of the conducting agent include carbon-based conducting agents such as natural graphite (scaly graphite, scalelike, earthy graphite and the like), artificial graphite, carbon black, acetylene black, ketjen black, carbon whiskers, carbon fibers and vapor phase growth carbon; and metal-based conducting agents composed of powders, fibers and the like of metals such as nickel, cobalt and copper. These conducting agents may be used alone, or may be used in combination of two or more thereof. A rare earth oxide such as yttrium oxide may be contained as an anticorrosive agent.

The blending amount of the conducting agent is preferably 0.1 to 10 parts by mass, more preferably 0.2 to 5 parts by mass based on 100 parts by mass of the hydrogen storing alloy powder. When the blending amount of the conducting agent is less than 0.1 part by mass, it is difficult to achieve sufficient conductivity. On the other hand, when the blending amount of the conducting agent is more than 10 parts by mass, the discharge capacity improving effect may be insufficient.

Examples of the binder include polyolefin-based resins such as polytetrafluoroethylene (PTHE), polyethylene and polypropylene, ethylene-propylene-diene rubber (EPDM), sulfonated EPDM, styrene butadiene rubber, fluororubber, polyvinyl alcohol, methyl cellulose, carboxymethyl cellulose and xanthan gum. These binders may be used alone, or may be used in combination of two or more thereof.

The blending amount of the binder is preferably 0.1 to 1.0 parts by mass, more preferably 0.5 to 1.0 parts by mass based on 100 parts by mass of the hydrogen storing alloy powder. When the blending amount of the binder is less than 0.1 part by mass, it is difficult to achieve sufficient thickenability. On the other hand, when the blending amount of the binder is more than 1.0 part by mass, the performance of the electrode may be deteriorated.

The positive electrode is, for example, an electrode containing as a positive active material a nickel hydroxide composite oxide formed by mixing zinc hydroxide or cobalt hydroxide with nickel hydroxide as a main component. As the nickel hydroxide composite oxide, one that is uniformly dispersed by a coprecipitation method is suitably used.

Preferably, the positive electrode contains an additive for improving electrode performance in addition to the nickel hydroxide composite oxide. The additive is, for example, a conductivity modifier such as cobalt hydroxide or cobalt oxide. Alternatively, the nickel hydroxide composite oxide may be coated with cobalt hydroxide, or the nickel hydroxide composite oxide may be partially oxidized by oxygen, an oxygen-containing gas, $K_2S_2O_8$, hypochlorous acid or the like.

As the additive, a compound containing a rare earth element such as Y or Yb, or an oxygen overvoltage improving substance such as a compound containing Ca can also be used. The rare earth element such as Y or Yb is partially dissolved and disposed on the surface of the negative electrode, and is therefore expected to exhibit an effect of suppressing corrosion of a negative active material.

The positive electrode may further contain the conducting agent, binder and so on as in the case of the negative electrode.

The above-mentioned positive electrode and negative electrode can be produced by, for example, adding the conducting agent, binder and so on to each active material as necessary, then mixing the mixture together with water or an organic solvent such as an alcohol or toluene to obtain a paste, applying the paste to a conductive support, drying the paste, and performing roll molding.

Examples of the conductive support include steel plates, and plated steel plates obtained by subjecting a steel plate to plating with a metal material such nickel. Examples of the form of the conductive support include foams, molded products of fiber groups, three-dimensional substrates subjected to irregularity processing, and two-dimensional substrates such as punching plates. Among these conductive supports, a foam made from nickel excellent in corrosion resistance to alkalis and resistance to oxidation and composed of a porous structure that is a structure excellent in current collection property is preferred as a conductive support for a positive electrode. On the other hand, as a conductive support for a negative electrode, a pierced steel plate obtained by subjecting to nickel plating an iron foil which is inexpensive and excellent in conductivity.

The thickness of the conductive support is preferably 30 to 100 μm, more preferably 40 to 70 μm. When the thickness of the conductive support is less than 30 μm, productivity may be deteriorated. On the other hand, when the thickness of the conductive support is more than 100 μm, the discharge capacity may be insufficient.

When the conductive support is porous, the inner diameter thereof is preferably 0.8 to 2 μm, more preferably 1 to 1.5 μm. When the inner diameter is less than 0.8 μm, productivity may be deteriorated. On the other hand, when the inner diameter is more than 2 μm, the retention capacity of the hydrogen storing alloy may be insufficient.

Examples of the method for applying a paste for each electrode to the conductive support include roller coating using an applicator roll etc., screw coating, blade coating, spin coating and bar coating.

Examples of the separator include a porous films and nonwoven fabrics made from a polyolefin-based resin such as polyethylene or polypropylene, an acryl, a polyamide or the like.

The weight per unit area of the separator is preferably 40 to 100 $g/m^2$. When the weight per unit area is less than 40 $g/m^2$, a short circuit or deterioration of self discharge performance may occur. On the other hand, when the weight per unit area is more than 100 $g/m^2$, the battery capacity tends to decrease because the ratio of the separator per unit volume increases. The air permeability of the separator is preferably 1 to 50 cm/sec. When the air permeability is less than 1 cm/sec, the battery internal pressure may be excessively high. On the other hand, when the air permeability is more than 50 cm/sec, a short circuit or deterioration of self discharge performance may occur. Further, the average fiber diameter of the separator is preferably 1 to 20 μm. When average fiber diameter is less than 1 μm, the strength of the separator may be reduced, leading to an increase in defect rate in a battery assembling step. On the other hand, when the average fiber diameter is more than 20 μm, a short circuit or deterioration of self discharge performance may occur.

Preferably, the separator is subjected to a hydrophilization treatment at the fiber surface thereof. Examples of the hydrophilization treatment include a sulfonation treatment, a corona treatment, a fluorine gas treatment and a plasma treatment. Particularly, a separator subjected to a sulfonation treatment at the fiber surface is preferred because it has a high capability of adsorbing impurities such as $NO_3^-$, $NO_2^-$ and $NH_3^-$ and eluted elements from a negative electrode, which cause a shuttle phenomenon, and therefore exhibits a high self discharge suppressing effect.

Examples of the alkali electrolyte solution include alkaline aqueous solutions containing potassium hydroxide, sodium hydroxide, lithium hydroxide or the like. The alkali electrolyte solutions may be used alone, or may be used in combination of two or more thereof.

The concentration of the alkali electrolyte solution is preferably 9.0 M or less, more preferably 5.0 to 8.0 M in terms of the sum of ion concentrations.

To the alkali electrolyte solution may be added various additives for improvement of the oxygen overvoltage at the positive electrode, improvement of corrosion resistance of the negative electrode and improvement of self discharge. Examples of such additives include oxides and hydroxides such as those of Y, Yb, Er, Ca and Zn. These additives may be used alone, or may be used in combination of two or more thereof.

In the case where the nickel-metal hydride rechargeable battery according to the second embodiment of the present invention is an open-type nickel-metal hydride rechargeable battery, the battery can be produced by, for example, sandwiching a negative electrode in a positive electrode with a separator interposed therebetween, fixing the electrodes so as to apply a predetermined pressure to the electrodes, injecting an alkali electrolyte solution in this state, and assembling an open-type cell.

On the other hand, in the case where the nickel-metal hydride rechargeable battery according to the second embodiment of the present invention is a closed-type nickel-metal hydride rechargeable battery, the battery can be produced by injecting an alkali electrolyte solution before or after laminating a positive electrode, a separator and a negative electrode, and sealing the electrolyte solution with an exterior material. In a closed-type nickel-metal hydride rechargeable battery formed by winding a power generating element in which a positive electrode and a negative electrode are laminated with a separator interposed therebetween, it is preferred to inject an alkali electrolyte solution in the power generating element before or after winding the power generating element. The method for injecting an alkali electrolyte solution is not particularly limited, and the alkali electrolyte solution may be injected at normal pressure, or for example, a vacuum impregnation method, a pressure impregnation method, a centrifugal impregnation method or the like may be used. Examples of the exterior material of the closed-type nickel-metal hydride rechargeable battery include those made of iron, iron subjected to plating with a metal material such as nickel, stainless steel, a polyolefin-based resin and so on.

The form of the closed-type nickel-metal hydride rechargeable battery is not particularly limited, and examples thereof include batteries including a positive electrode, a negative electrode and a monolayer or multilayer separator, such as coin batteries, button batteries, prismatic batteries and flat batteries, and cylindrical batteries including a roll-shaped positive electrode, negative electrode and separator.

The present invention will now be described further in detail by way of examples, but the present invention is not limited to these examples.

EXAMPLES (Examples According to the First Embodiment of the Present Invention)
<Method for Preparing Hydrogen Storing Alloy>

A predetermined amount of a raw material ingot was weighed in such a manner that the alloy had a composition in each of Examples 1 to 10 and Comparative Examples 1 to 9 as described in Table 1, and the raw material ingot was added in a crucible, and heated to 1500° C. under a decompressed argon gas atmosphere using a high-frequency melting furnace, so that the raw material was melted. After the raw material was melted, it was rapidly cooled at 500000 K/sec by using a melt spinning method, so that the alloy was solidified.

Next, the obtained alloy was heat-treated for 5 hours under an atmosphere of argon gas compressed to 0.2 MPa (gauge pressure, the same hereinafter), and the obtained hydrogen storing alloy was ground to obtain a hydrogen storing alloy powder having an average particle size (D50) of 50 μm.

The heat treatment was performed at 950° C. for the hydrogen storing alloy powders of Examples 1 to 9 and Comparative Examples 1 to 9, and at 930° C. for the hydrogen storing alloy of Example 10.

<Preparation of Open-type Nickel Hydrogen Battery>

3 parts by mass of a nickel powder (#210 manufactured by INCO Limited) was added to and mixed with 100 parts by mass of the hydrogen storing alloy powder prepared in the manner described above, an aqueous solution with a thickener (methyl cellulose) dissolved therein was then added, and 1 part by mass of a binder (styrene butadiene rubber) was further added to form a paste. The paste was applied to both surfaces of a 35 μm-thick pierced steel plate (opening ratio: 50%), and dried, and the coated plate was then pressed to a thickness of 0.33 mm to obtain a negative electrode plate.

For a positive electrode plate, a sintering nickel hydroxide electrode having a capacity three times as large as the negative electrode capacity.

The negative electrode plate prepared in the manner described above was sandwiched in the positive electrode plate with a separator interposed therebetween to form electrodes, a 7 M aqueous potassium hydroxide solution was injected with these electrodes fixed in such a manner as to apply a pressure of 1 kgf to the electrodes, and an open-type cell was assembled.

<Evaluation of Open-Type Nickel Hydrogen Battery>

A cycle was repeated 10 times in which the open-type nickel hydrogen battery prepared in the manner described above was charged to 150% at 0.1 ItA (31 mA/g) and discharged to a negative electrode final potential of −0.6 V (to Hg/HgO) at 0.2 ItA in a water bath at 20° C. Further a cycle was repeated 40 times in which the open-type nickel hydrogen battery was charged to 105% at 1 ItA and discharged to a negative electrode final potential of −0.6 V (to Hg/HgO) at 1 ItA. Under these conditions, total 50 cycles of charge-discharge were performed.

<Measurement of Specific Surface Area>

Measurement of the specific surface area of the alloy before and after the cycle test was performed in accordance with the following procedure. The negative electrode plate was taken out from the battery before and after each of the 40 cycles of charge-discharge, washed with water, and dried, and a mixture layer portion and a base plate (a punching steel plate with iron subjected to nickel plating) were then separated from each other. Next, the mixture layer portion was ground with a mortar, and put in a specific surface area measurement apparatus (MONOSORB manufactured by QUANTACHROME Co.), and the specific surface area was measured by a BET method.

<Analysis of Crystal Phase>

Analysis of the crystal phase was performed in accordance with the following procedure. X-ray diffraction measurement of the alloy powder was performed using a powder X-ray diffractometer (Rigaku MinifulexII). Cu was used for an X-ray tube, an accelerating voltage of 30 kV and a current of 15 mA were set as power, and Cu-Kα was used. Step scanning with an integral time of 2 seconds at intervals of 0.02 was performed over a measurement range of 2θ=5-90°. The powder X-ray diffraction pattern obtained in the above-mentioned measurement was analyzed by a Rietveld method (analysis software: RIETAN-2000) to calculate an abundance ratio (% by mass) of the crystal phase contained in the alloy.

Next, in the following manner, a closed-type battery for a charge-discharge cycle test was prepared, and a charge-discharge cycle test was conducted.

<Preparation of Positive Electrode Plate for Nickel-Metal Hydride Rechargeable Battery>

The surface of nickel hydroxide containing 3% by mass of zinc and 0.6% by mass of cobalt in a solid solution state was coated with a 7% by mass of cobalt hydroxide, and then subjected to an air oxidation treatment at 110° C. for 1 hour using a 18 M sodium hydroxide solution. The material thus obtained was used as a positive active material. Further, 2% by mass of $Yb_2O_3$ was added to and mixed with the positive active material, an aqueous solution with a thickener (carboxymethyl cellulose) dissolved therein was then added to prepare a paste, and foamed nickel having a substrate surface density of 300 g/m² was filled with the paste, dried, and the pressed to a predetermined thickness to prepare a positive electrode plate having a capacity of 2000 mAh.

<Preparation of Negative Electrode Plate for Nickel-Metal Hydride Rechargeable Battery>

An aqueous solution with a thickener (methyl cellulose) dissolved therein was added to 100 parts by mass of the hydrogen storing alloy powder of each of Examples 1 to 10 and Comparative Examples 1 to 9, which was ground so as to have an average particle size D50 of 50 μm, and 1 part by mass of a binder (styrene butadiene rubber) was further added to form a paste. The paste was applied to both surfaces of a 35 μm-thick pierced steel plate, and dried, and the coated plate was then pressed to a predetermined thickness to prepare a negative electrode plate having a capacity of 2600 mAh.

<Preparation of Closed-type Nickel-Metal Hydride Rechargeable Battery>

A separator (120 μm-thick polypropylene nonwoven fabric) was folded in two at substantially the center in the longitudinal direction, the positive electrode plate was sandwiched therein, the negative electrode plate containing the hydrogen storing alloy powder of each of Examples 1 to 10 and Comparative Examples 1 to 9 was superimposed on the outer side, and the layered product thus obtained was wound in such a manner as to situate the negative electrode plate on the outer peripheral side, so that an electrode group was formed. The obtained electrode group was housed in cylindrical metallic battery case, 2.6 g of an electrolyte solution containing 5 M KOH, 3 M NaOH and 0.8 M LiOH was then injected therein, and the battery case was capped with a metallic lid provided with a safety valve, so that an AA size nickel-metal hydride rechargeable battery having a capacity of 2100 mAh was prepared as a test battery.

<Initial Formation>

For each test battery, initial formation was performed in accordance with the following procedure. A cycle was repeated twice in which the battery was charged at 200 mA for 16 hours, and then discharged to 1 V at 400 mA at 20° C. Thereafter, the battery was stored at 40° C. for 48 hours. A cycle was then repeated twice in which the battery was charged at 20° C. at 200 mA for 16 hours, rested for 1 hour, and discharged to 1 V at 400 mA, thus completing formation.

<Charge-Discharge Cycle Test>

The charge-discharge cycle test was conducted with the battery charged at −dV=5 mV at 0.5 ItA, then rested for 30 minutes, and then discharged at 1 V (20° C.) at 0.5 ItA. The time at which the discharge capacity decreased to 60% of the initial capacity was judged as the end of the cycle life.

The alloy compositions of the hydrogen storing alloys of Examples 1 to 10 and Comparative Examples 1 to 9, and also the results of measurement of the abundance ratio of the crystal phase, the specific surface area, and the cycle life of the nickel-metal hydride rechargeable battery using the hydrogen storing alloy are shown in Table 1.

TABLE 1

| | Alloy composition | | | | | | | | | | B/A RATIO |
|---|---|---|---|---|---|---|---|---|---|---|---|
| | RE ATOM | | | | | | M ATOM | | | | (GENERAL |
| | La | Nd | Pr | Y | Sm | Mg | Ni | Al | Mn | Co | FORMULA: X) |
| Example 1 | 0.4 | 0 | 0 | | 0.49 | 0.11 | 3.26 | 0.16 | 0 | 0 | 3.42 |
| Example 2 | 0.5 | 0 | 0 | | 0.39 | 0.11 | 3.26 | 0.16 | 0 | 0 | 3.42 |
| Example 3 | 0.4 | 0 | 0 | | 0.49 | 0.11 | 3.16 | 0.16 | 0 | 0 | 3.32 |
| Example 4 | 0.3 | 0 | 0 | | 0.59 | 0.11 | 3.26 | 0.16 | 0 | 0 | 3.42 |
| Example 5 | 0.3 | 0.1 | 0 | | 0.49 | 0.11 | 3.26 | 0.16 | 0 | 0 | 3.42 |
| Example 6 | 0.3 | 0 | 0.1 | | 0.49 | 0.11 | 3.26 | 0.16 | 0 | 0 | 3.42 |
| Example 7 | 0.3 | 0 | 0 | 0.1 | 0.49 | 0.11 | 3.26 | 0.16 | 0 | 0 | 3.42 |
| Example 8 | 0.4 | 0 | 0 | | 0.49 | 0.11 | 3.21 | 0.16 | 0.1 | 0 | 3.42 |
| Example 9 | 0.4 | 0 | 0 | | 0.49 | 0.11 | 3.16 | 0.16 | 0 | 0.1 | 3.42 |
| Example 10 | 0.4 | 0 | 0 | | 0.49 | 0.11 | 3.26 | 0.16 | 0 | 0 | 3.42 |
| Comparative Example 1 | 0.84 | 0 | 0 | | 0 | 0.16 | 3.26 | 0.16 | 0 | 0 | 3.42 |
| Comparative Example 2 | 0.29 | 0 | 0 | | 0.6 | 0.11 | 3.26 | 0.16 | 0 | 0 | 3.42 |
| Comparative Example 3 | 0.6 | 0 | 0 | | 0.29 | 0.11 | 3.26 | 0.16 | 0 | 0 | 3.42 |
| Comparative Example 4 | 0.35 | 0 | 0 | | 0.49 | 0.16 | 3.26 | 0.16 | 0 | 0 | 3.42 |
| Comparative Example 5 | 0.4 | 0 | 0 | | 0.49 | 0.11 | 3.34 | 0.08 | 0 | 0 | 3.42 |
| Comparative Example 6 | 0.4 | 0 | 0 | | 0.49 | 0.11 | 3.21 | 0.21 | 0 | 0 | 3.42 |
| Comparative Example 7 | 0.5 | 0 | 0 | | 0.39 | 0.11 | 3.39 | 0.16 | 0 | 0 | 3.55 |

TABLE 1-continued

| | | | | | | | | | | |
|---|---|---|---|---|---|---|---|---|---|---|
| Comparative Example 8 | 0.4 | 0 | 0 | 0.49 | 0.11 | 2.99 | 0.16 | 0 | 0 | 3.15 |
| Comparative Example 9 | 0 | 0.4 | 0 | 0.49 | 0.11 | 3.26 | 0.16 | 0 | 0 | 3.42 |

| | Abundance ratio of crystal phase (% by mass) | | | | | | Specific surface area ($m^2/g$) | Cycle life |
|---|---|---|---|---|---|---|---|---|
| | $Ce_2Ni_7$ | $Gd_2Co_7$ | $Pr_5Co_{19}$ | $Ce_5Co_{19}$ | $CaCu_5$ | Others | | |
| Example 1 | 74 | 0 | 15 | 6 | 4 | 1 | 1.52 | 190 |
| Example 2 | 75 | 0 | 11 | 5 | 2 | 7 | 1.64 | 180 |
| Example 3 | 81 | 0 | 10 | 6 | 2 | 1 | 1.63 | 190 |
| Example 4 | 69 | 0 | 14 | 12 | 4 | 1 | 1.68 | 170 |
| Example 5 | 76 | 0 | 10 | 9 | 4 | 1 | 1.5 | 200 |
| Example 6 | 71 | 0 | 18 | 6 | 4 | 1 | 1.49 | 200 |
| Example 7 | 83 | 0 | 8 | 6 | 2 | 1 | 1.52 | 190 |
| Example 8 | 72 | 0 | 15 | 7 | 5 | 1 | 1.62 | 180 |
| Example 9 | 73 | 0 | 15 | 6 | 4 | 2 | 1.48 | 190 |
| Example 10 | 60 | 0 | 19 | 16 | 4 | 1 | 1.62 | 170 |
| Comparative Example 1 | 70 | 0 | 23 | 5 | 2 | 0 | 2.46 | 50 |
| Comparative Example 2 | 68 | 0 | 32 | 0 | 0 | 0 | 1.91 | 100 |
| Comparative Example 3 | 50 | 5 | 21 | 15 | 5 | 4 | 1.81 | 110 |
| Comparative Example 4 | 70 | 0 | 14 | 1 | 15 | 0 | 2.27 | 50 |
| Comparative Example 5 | 75 | 0 | 10 | 4 | 2 | 9 | 1.95 | 80 |
| Comparative Example 6 | 65 | 0 | 17 | 6 | 12 | 0 | 2.23 | 70 |
| Comparative Example 7 | 54 | 0 | 31 | 11 | 2 | 2 | 1.85 | 100 |
| Comparative Example 8 | 67 | 0 | 5 | 2 | 10 | 16 | 2.15 | 60 |
| Comparative Example 9 | 71 | 0 | 20 | 5 | 2 | 2 | 1.8 | 90 |

When corroded, the hydrogen storing alloy morphologically changes with a hydroxide of rare earth etc. generated on the surface. Thus, a specific surface area value can be determined and used as an index of the alloy corrosion level. A smaller specific surface area value may correspond to a lower corrosion level, while a larger specific surface area value may correspond to a high corrosion level. From Table 1, it is apparent that the hydrogen storing alloys of Examples 1 to 10 which are represented by the general formula: $(RE_{1-a-b}Sm_aMg_b)(Ni_{1-c-d}Al_cM_d)_x$ (where $0.3<a<0.6$; $0<b<0.16$; $0.1<cx<0.2$; $0 \leq dx \leq 0.1$; $3.2<x<3.5$; RE is at least one element selected from the group consisting of a rare earth element other than Sm, and Y, and essentially contains La; and M is Mn and/or Co) have a smaller specific surface area value and a lower corrosion level as compared to the hydrogen storing alloy in which a (Sm substitution amount) is 0.3 or less (Comparative Examples 1 and 3) or 0.6 or more (Comparative Example 2), the hydrogen storing alloy in which b is 0.16 or more (Comparative Example 4), the hydrogen storing alloy in which cx is 0.1 or less (Comparative Example 5) or 0.2 or more (Comparative Example 6), the hydrogen storing alloy in which x (B/A ratio) is 3.5 or more (Comparative Example 7) or 3.2 or less (Comparative Example 8), and the hydrogen absorbing alloy which does not contain La as a RE atom (Comparative Example 9). The specific surface area value is preferably 1.7 $m^2/g$ or less, more preferably 1.60 $m^2/g$ or less.

From Table 1, it is apparent that the hydrogen storing alloys of Examples 1 to 10 which have a small specific surface area have improved corrosion resistance (durability) as compared to the hydrogen storing alloys of Comparative Examples 1 to 9 which have a large specific surface area, and the nickel-metal hydride rechargeable batteries obtained using the hydrogen storing alloys of Examples 1 to 10 have a remarkably improved cycle life as compared to the nickel-metal hydride rechargeable batteries obtained using the hydrogen storing alloys of Comparative Examples 1 to 9. Particularly, the hydrogen storing alloy in which as RE, La is contained in an amount of 0.3 or more in terms of a molar amount based on the total amount of RE, Sm and Mg, and also Nd and/or Pr are used in combination (Examples 5 and 6) has a small specific surface area, and is excellent in corrosion resistance (durability), and the nickel-metal hydride rechargeable battery obtained using such a hydrogen storing alloy has an improved cycle life.

When among the hydrogen storing alloys of Examples 1 to 10 which have a small specific surface area, the hydrogen storing alloys of Examples 1 to 3 and 5 to 9 which contain 70% by mass or more of a $Ce_2Ni_7$ phase as a crystal phase of the alloy are used, corrosion resistance (durability) is further improved, and the cycle life of the nickel-metal hydride rechargeable battery is improved.

(Examples According to the Second Embodiment of the Present Invention)
<Method for Preparing Hydrogen Storing Alloy>

A predetermined amount of a raw material ingot was weighed in such a manner that the alloy had a composition in each of Examples 1 to 13 and Comparative Examples 1 to 8 as described in Table 2, and the raw material ingot was added in a crucible, and heated to 1500° C. under a decompressed argon gas atmosphere using a high-frequency melting furnace, so that the raw material was melted. After the raw material was melted, it was rapidly cooled at 500000 K/sec by using a melt spinning method, so that the alloy was solidified.

Next, the obtained alloy was heat-treated for 5 hours under an atmosphere of argon gas compressed to 0.2 MPa (gauge pressure, the same hereinafter), and the obtained hydrogen storing alloy was ground to obtain a hydrogen storing alloy powder having an average particle size (D50) of 50 μm.

The heat treatment was performed at 950° C. for the hydrogen storing alloy powders of Examples 1 to 12 and Comparative Examples 1 to 8, and at 930° C. for the hydrogen storing alloy of Example 13.

<Preparation of Open-type Nickel Hydrogen Battery>

3 parts by mass of a nickel powder (#210 manufactured by INCO Limited) was added to and mixed with 100 parts by mass of the hydrogen storing alloy powder prepared in the manner described above, an aqueous solution with a thickener (methyl cellulose) dissolved therein was then added, and 1 part by mass of a binder (styrene butadiene rubber) was further added to form a paste. The paste was applied to both surfaces of a 35 μm-thick pierced steel plate (opening ratio: 50%), and dried, and the coated plate was then pressed to a thickness of 0.33 mm to obtain a negative electrode plate.

For a positive electrode plate, a sintering nickel hydroxide electrode having a capacity three times as large as the negative electrode capacity.

The negative electrode plate prepared in the manner described above was sandwiched in the positive electrode plate with a separator interposed therebetween to form electrodes, a 7 M aqueous potassium hydroxide solution was injected with these electrodes fixed in such a manner as to apply a pressure of 1 kgf to the electrodes, and an open-type cell was assembled.

<Evaluation of Open-type Nickel Hydrogen Battery>

A cycle was repeated 10 times in which the open-type nickel hydrogen battery prepared in the manner described above was charged to 150% at 0.1 ItA (31 mA/g) and discharged to a negative electrode final potential of −0.6 V (to Hg/HgO) at 0.2 ItA in a water bath at 20° C. Further a cycle was repeated 40 times in which the open-type nickel hydrogen battery was charged to 105% at 1 ItA and discharged to a negative electrode final potential of −0.6 V (to Hg/HgO) at 1 ItA. Under these conditions, total 50 cycles of charge-discharge were performed.

<Measurement of Specific Surface Area>

Measurement of the specific surface area of the alloy before and after the cycle test was performed in accordance with the following procedure. The negative electrode plate was taken out from the battery before and after each of the 40 cycles of charge-discharge, washed with water, and dried, and a mixture layer portion and a base plate (a punching steel plate with iron subjected to nickel plating) were then separated from each other. Next, the mixture layer portion was ground with a mortar, and put in a specific surface area measurement apparatus (MONOSORB manufactured by QUANTACHROME Co.), and the specific surface area was measured by a BET method.

<Analysis of Crystal Phase>

Analysis of the crystal was performed in accordance with the following procedure. X-ray diffraction measurement of the alloy powder was performed using a powder X-ray diffractometer (Rigaku MinifulexII). Cu was used for an X-ray tube, an accelerating voltage of 30 kV and a current of 15 mA were set as power, and Cu-Kα was used. Step scanning with an integral time of 2 seconds at intervals of 0.02 was performed over a measurement range of 2θ=5–90°. The powder X-ray diffraction pattern obtained in the above-mentioned measurement was analyzed by a Rietveld method (analysis software: RIETAN-2000) to calculate an abundance ratio (% by mass) of the crystal phase contained in the alloy.

Next, in the following manner, a closed-type battery for a charge-discharge cycle test was prepared, and a charge-discharge cycle test was conducted.

<Preparation of Positive Electrode Plate for Nickel-Metal Hydride Rechargeable Battery>

The surface of nickel hydroxide containing 3% by mass of zinc and 0.6% by mass of cobalt in a solid solution state was coated with a 7% by mass of cobalt hydroxide, and then subjected to an air oxidation treatment at 110° C. for 1 hour using a 18 M sodium hydroxide solution. The material thus obtained was used as a positive active material. Further, 2% by mass of $Yb_2O_3$ was added to and mixed with the positive active material, an aqueous solution with a thickener (carboxymethyl cellulose) dissolved therein was then added to prepare a paste, and foamed nickel having a substrate surface density of 300 $g/m^2$ was filled with the paste, dried, and the pressed to a predetermined thickness to prepare a positive electrode plate having a capacity of 2000 mAh.

<Preparation of Negative Electrode Plate for Nickel-Metal Hydride Rechargeable Battery>

An aqueous solution with a thickener (methyl cellulose) dissolved therein was added to 100 parts by mass of the hydrogen storing alloy powder of each of Examples 1 to 13 and Comparative Examples 1 to 8, which was ground so as to have an average particle size D50 of 50 μm, and 1 part by mass of a binder (styrene butadiene rubber) was further added to form a paste. The paste was applied to both surfaces of a 35 μm-thick pierced steel plate, and dried, and the coated plate was then pressed to a predetermined thickness to prepare a negative electrode plate having a capacity of 2600 mAh.

<Preparation of Closed-Type Nickel-Metal Hydride Rechargeable Battery>

A separator (120 μm-thick polypropylene nonwoven fabric) was folded in two at substantially the center in the longitudinal direction, the positive electrode plate was sandwiched therein, the negative electrode plate containing the hydrogen storing alloy powder of each of Examples 1 to 13 and Comparative Examples 1 to 8 was superimposed on the outer side, and the layered product thus obtained was wound in such a manner as to situate the negative electrode plate on the outer peripheral side, so that an electrode group was formed. The obtained electrode group was housed in cylindrical metallic battery case, 2.6 g of an electrolyte solution containing 5 M KOH, 3 M NaOH and 0.8 M LiOH was then injected therein, and the battery case was capped with a metallic lid provided with a safety valve, so that an AA size nickel-metal hydride rechargeable battery having a capacity of 2100 mAh was prepared as a test battery.

<Initial Formation>

For each test battery, initial formation was performed in accordance with the following procedure. A cycle was repeated twice in which the battery was charged at 200 mA for 16 hours, and then discharged to 1 V at 400 mA at 20° C. Thereafter, the battery was stored at 40° C. for 48 hours. A cycle was then repeated twice in which the battery was charged at 20° C. at 200 mA for 16 hours, rested for 1 hour, and discharged to 1 V at 400 mA, thus completing formation.

<Charge-Discharge Cycle Test>

The charge-discharge cycle test was conducted with the battery charged at −dV=5 mV at 0.5 ItA, then rested for 30 minutes, and then discharged at 1 V (20° C.) at 0.5 ItA. The time at which the discharge capacity decreased to 60% of the initial capacity was judged as the end of the cycle life.

The alloy compositions of the hydrogen storing alloys of Examples 1 to 13 and Comparative Examples 1 to 8, and also the results of measurement of the abundance ratio of the crystal phase, the specific surface area, and the cycle life of the nickel-metal hydride rechargeable battery using the hydrogen storing alloy are shown in Table 2.

TABLE 2

| | Alloy composition | | | | | | | | | | B/A ratio (general formula: X) |
|---|---|---|---|---|---|---|---|---|---|---|---|
| | RE ATOM | | | | | | | | M ATOM | | |
| | La | Nd | Pr | Y | Sm | Mg | Ni | Al | Mn | Co | |
| Example 1 | 0.72 | 0 | 0 | | 0.13 | 0.15 | 3.48 | 0.15 | 0 | 0 | 3.63 |
| Example 2 | 0.75 | 0 | 0 | | 0.1 | 0.15 | 3.48 | 0.15 | 0 | 0 | 3.63 |
| Example 3 | 0.6 | 0 | 0 | | 0.25 | 0.15 | 3.48 | 0.15 | 0 | 0 | 3.63 |
| Example 4 | 0.76 | 0 | 0 | | 0.13 | 0.11 | 3.48 | 0.15 | 0 | 0 | 3.63 |
| Example 5 | 0.72 | 0 | 0 | | 0.13 | 0.15 | 3.53 | 0.1 | 0 | 0 | 3.63 |
| Example 6 | 0.72 | 0 | 0 | | 0.13 | 0.15 | 3.55 | 0.15 | 0 | 0 | 3.7 |
| Example 7 | 0.72 | 0 | 0 | | 0.13 | 0.15 | 3.45 | 0.15 | 0 | 0 | 3.6 |
| Example 8 | 0.62 | 0.1 | 0 | | 0.13 | 0.15 | 3.48 | 0.15 | 0 | 0 | 3.63 |
| Example 9 | 0.62 | 0 | 0.1 | | 0.13 | 0.15 | 3.48 | 0.15 | 0 | 0 | 3.63 |
| Example 10 | 0.62 | 0 | 0 | 0.1 | 0.13 | 0.15 | 3.48 | 0.15 | 0 | 0 | 3.63 |
| Example 11 | 0.72 | 0 | 0 | | 0.13 | 0.15 | 3.48 | 0.1 | 0.1 | 0 | 3.63 |
| Example 12 | 0.72 | 0 | 0 | | 0.13 | 0.15 | 3.48 | 0.1 | 0 | 0.1 | 3.63 |
| Example 13 | 0.72 | 0 | 0 | | 0.13 | 0.15 | 3.48 | 0.15 | 0 | 0 | 3.63 |
| Comparative Example 1 | 0.77 | 0 | 0 | | 0.08 | 0.15 | 3.48 | 0.15 | 0 | 0 | 3.63 |
| Comparative Example 2 | 0.57 | 0 | 0 | | 0.28 | 0.15 | 3.48 | 0.15 | 0 | 0 | 3.63 |
| Comparative Example 3 | 0.79 | 0 | 0 | | 0.13 | 0.08 | 3.48 | 0.15 | 0 | 0 | 3.63 |
| Comparative Example 4 | 0.67 | 0 | 0 | | 0.13 | 0.2 | 3.48 | 0.15 | 0 | 0 | 3.63 |
| Comparative Example 5 | 0.72 | 0 | 0 | | 0.13 | 0.15 | 3.61 | 0.02 | 0 | 0 | 3.63 |
| Comparative Example 6 | 0.72 | 0 | 0 | | 0.13 | 0.15 | 3.43 | 0.2 | 0 | 0 | 3.63 |
| Comparative Example 7 | 0.72 | 0 | 0 | | 0.13 | 0.15 | 3.4 | 0.15 | 0 | 0 | 3.55 |
| Comparative Example 8 | 0.72 | 0 | 0 | | 0.13 | 0.15 | 3.58 | 0.15 | 0 | 0 | 3.73 |

| | Abundance ratio of crystal phase (% by mass) | | | | | | | Specific surface area ($m^2/g$) | Cycle life |
|---|---|---|---|---|---|---|---|---|---|
| | $Ce_2Ni_7$ | $Gd_2Co_7$ | $Pr_5Co_{19}$ | $Ce_5Co_{19}$ | $CaCu_5$ | Others | Total | | |
| Example 1 | 0 | 0 | 5 | 92 | 3 | 0 | 100 | 1.33 | 200 |
| Example 2 | 0 | 0 | 7 | 89 | 3 | 1 | 100 | 1.35 | 190 |
| Example 3 | 13 | 0 | 15 | 67 | 4 | 1 | 100 | 1.42 | 160 |
| Example 4 | 0 | 0 | 7 | 90 | 3 | 0 | 100 | 1.31 | 180 |
| Example 5 | 0 | 0 | 4 | 95 | 1 | 0 | 100 | 1.25 | 200 |
| Example 6 | 0 | 0 | 6 | 94 | 0 | 0 | 100 | 1.41 | 170 |
| Example 7 | 0 | 0 | 4 | 95 | 1 | 0 | 100 | 1.33 | 190 |
| Example 8 | 0 | 0 | 7 | 90 | 3 | 0 | 100 | 1.23 | 210 |
| Example 9 | 0 | 0 | 6 | 90 | 4 | 0 | 100 | 1.22 | 210 |
| Example 10 | 10 | 0 | 1 | 85 | 4 | 0 | 100 | 1.45 | 160 |
| Example 11 | 0 | 0 | 7 | 82 | 11 | 0 | 100 | 1.47 | 160 |
| Example 12 | 0 | 0 | 5 | 92 | 3 | 0 | 100 | 1.29 | 200 |
| Example 13 | 6 | 0 | 11 | 80 | 2 | 1 | 100 | 1.45 | 170 |
| Comparative Example 1 | 0 | 0 | 20 | 72 | 7 | 1 | 100 | 1.56 | 100 |
| Comparative Example 2 | 20 | 0 | 23 | 40 | 15 | 2 | 100 | 1.59 | 90 |
| Comparative Example 3 | 0 | 0 | 4 | 95 | 1 | 0 | 100 | 1.67 | 80 |
| Comparative Example 4 | 10 | 0 | 15 | 53 | 18 | 4 | 100 | 1.65 | 80 |
| Comparative Example 5 | 5 | 1 | 15 | 65 | 12 | 2 | 100 | 1.74 | 80 |
| Comparative Example 6 | 0 | 0 | 21 | 47 | 18 | 14 | 100 | 1.58 | 90 |
| Comparative Example 7 | 21 | 0 | 27 | 42 | 9 | 1 | 100 | 1.61 | 90 |
| Comparative Example 8 | 0 | 0 | 18 | 65 | 16 | 1 | 100 | 1.68 | 90 |

When corroded, the hydrogen storing alloy morphologically changes with a hydroxide of rare earth etc. generated on the surface. Thus, a specific surface area value can be determined and used as an index of the alloy corrosion level. A smaller specific surface area value may correspond to a lower corrosion level, while a larger specific surface area may correspond to a high corrosion level. A hydrogen storing alloy represented by the general formula: $(RE_{1-a-b}Sm_aMg_b)(Ni_{1-c-d}Al_cM_d)_x$ (where $0.1<a<0.25$; $0.1<b<0.2$; $0.02<cx<0.2$; $0 \le dx \le 0.1$; $3.6<x<3.7$; RE is at least one element selected from the group consisting of a rare earth element other than Sm, and Y, and essentially contains La; and M is Mn and/or Co). It is apparent that the hydrogen storing alloys of Examples 1 to 13 have a smaller specific surface area value and a lower corrosion level as compared to the hydrogen storing alloy in which a (Sm substitution amount) is less than 0.1 (Comparative Examples 1) or more than 0.25 (Comparative Example 2), the hydrogen storing alloy in which b is 0.1 or less (Comparative Example 3) or 0.2 or more (Comparative Example 4), the hydrogen storing alloy in which cx is 0.02 or less (Comparative Example 5) or 0.2 or more (Comparative Example 6), the hydrogen storing alloy in which x (B/A ratio) is less than 3.6 (Comparative Example 7) or more than 3.7 (Comparative Example 8). The specific surface area value is preferably 1.5 m²/g or less, more preferably 1.40 m²/g or less.

From Table 2, it is apparent that the hydrogen storing alloys of Examples 1 to 13 which have a small specific surface area have improved corrosion resistance (durability) as compared to the hydrogen storing alloys of Comparative Examples 1 to 8 which have a large specific surface area, and the nickel-metal hydride rechargeable batteries obtained using the hydrogen storing alloys of Examples 1 to 13 have a remarkably improved cycle life as compared to the nickel-metal hydride rechargeable batteries obtained using the hydrogen storing alloys of Comparative Examples 1 to 8. Particularly, the hydrogen storing alloy in which as RE, La is contained in an amount of 0.6 or more in terms of a molar amount based on the total amount of RE, Sm and Mg, and also Nd and/or Pr are used in combination (Examples 8 and 9) or the hydrogen storing alloy containing Co as an M atom (Example 12) has a small specific surface area, and is excellent in corrosion resistance (durability), and the nickel-metal hydride rechargeable battery obtained using such a hydrogen storing alloy has an improved cycle life.

The hydrogen storing alloys of Examples 1 to 13 have a small specific surface area, and has improved corrosion resistance (durability) because they contain 80% by mass of a $Pr_5Co_{19}$ phase and $Ce_5Co_{19}$ phase as a crystal phase of the alloy, and thus the cycle life of the nickel-metal hydride rechargeable battery is improved. When the hydrogen storing alloy containing 90% by mass or more of both the phases (Examples 1, 2, 4 to 9, 12 and 13) is used, the cycle life of the nickel-metal hydride rechargeable battery is further improved.

According to the present invention, a hydrogen storing alloy having high corrosion resistance (durability), and therefore when the hydrogen storing alloy is used as a negative electrode of a nickel-metal hydride rechargeable battery, a nickel-metal hydride rechargeable battery excellent in cycle life can be provided.

What is claimed is:

1. A hydrogen storing alloy represented by the general formula: $(RE_{1-a-b}Sm_aMg_b)(Ni_{1-c-d}Al_cM_d)_x$ (where $0.3<a<0.6$; $0<b<0.16$; $0.1<cx<0.2$; $0 \le dx \le 0.1$; $3.2<x<3.5$; RE is at least one element selected from the group consisting of a rare earth element other than Sm, and Y, and essentially contains La; and M is Mn and/or Co),
   wherein the content of La in RE is 0.3 or more in terms of a molar amount based on the total amount of RE, Sm and Mg.

2. The hydrogen storing alloy according to claim 1, wherein RE contains Nd and/or Pr.

3. The hydrogen storing alloy according to claim 2, wherein the hydrogen storing alloy contains 70% by mass or more of a $Ce_2Ni_7$ phase as a crystal phase of the alloy.

4. The hydrogen storing alloy according to claim 1, wherein the hydrogen storing alloy contains 70% by mass or more of a $Ce_2Ni_7$ phase as a crystal phase of the alloy.

5. An electrode comprising the hydrogen storing alloy according to claim 1.

6. A nickel-metal hydride rechargeable battery comprising the electrode according to claim 5 as a negative electrode.

7. A hydrogen storing alloy represented by the general formula: $(RE_{1-a-b}Sm_aMg_b)(Ni_{1-c-d}Al_cM_d)_x$ (where $0.1 \le a \le 0.25$; $0.1<b<0.2$; $0.02<cx<0.2$; $0 \le dx \le 0.1$; $3.6 \le x \le 3.7$; RE is at least two elements selected from the group consisting of a rare earth element other than Sm, and Y, and essentially contains La and contains Nd and/or Pr; and M is Mn and/or Co).

8. The hydrogen storing alloy according to claim 7, wherein the content of La in RE is 0.6 or more in terms of a molar amount based on the total amount of RE, Sm and Mg.

9. The hydrogen storing alloy according to claim 8, wherein the hydrogen storing alloy contains 80% by mass or more of a $Pr_5Co_{19}$ phase and $Ce_5Co_{19}$ phase as a crystal phase of the alloy.

10. The hydrogen storing alloy according to claim 7, wherein the hydrogen storing alloy contains 80% by mass or more of a $Pr_5Co_{19}$ phase and $Ce_5Co_{19}$ phase as a crystal phase of the alloy.

11. An electrode comprising the hydrogen storing alloy according to claim 7.

12. A nickel-metal hydride rechargeable battery comprising the electrode according to claim 11 as a negative electrode.

* * * * *